3,144,403
SWEETENING HYDROCARBONS
Lawrence N. Jacob, Toledo, Ohio, assignor to Sun Oil Company, Philadelphia, Pa., a corporation of New Jersey
No Drawing. Filed Nov. 24, 1961, Ser. No. 154,879
4 Claims. (Cl. 208—207)

This invention relates to inhibitor sweetening of hydrocarbons such as petroleum fractions, and more particularly to the use of anion exchange resins in such sweetening processes.

It is well known in the art to sweeten hydrocarbons containing mercaptans by contact with an inhibitor sweetening agent and oxygen in the presence of aqueous alkali metal hydroxide as basic catalyst. The usual inhibitor sweetening agents are N-alkyl phenylene diamines, the most commonly used agent being N,N'-di-secondary butyl phenylene diamine.

Conventional inhibitor sweetening is frequently subject to disadvantage with respect to the rate of mercaptan reduction and the properties of the hydrocarbon product, e.g., alkalinity and gum rating. Suspension of the liquid basic catalyst in the hydrocarbon product frequently causes unsatisfactory such properties.

The present invention provides a process which is unpredictably improved over conventional inhibitor sweetening with respect to rate of mercaptan reduction and improvement in properties of the hydrocarbon product, the latter being obtained through exclusion therefrom of detrimental alkaline substances. The process of the invention involves the use of a solid anion exchange resin as the basic catalyst.

Solid anion exchange resins have been employed in the prior art for the removal of mercaptans from hydrocarbon materials, such removal involving the sorbing of mercaptans on the ion exchange resin. A disadvantage of this process is that frequent regeneration of the ion exchange resin is necessary in order to regenerate the basic groups which are active in the removal of mercaptans. The process of the present invention overcomes this disadvantage, since the ion exchange resin acts primarily as a catalyst and appears to be at least partially regenerated during the course of the sweetening operation. Accordingly, it has a longer life prior to a separate regeneration, than in the processes of the prior art.

It is to be understood that any suitable means of regenerating the ion exchange resin can be employed in any case where the resin has ultimately deactivated to the point where regeneration is required. Various methods of regeneration are known in the prior art, such as that disclosed in Patent No. 2,718,489, issued September 20, 1955, to H. L. Coonradt and W. K. Leaman. Any of the known regeneration methods can be employed.

Solid anion exchange resins are generally satisfactory for use according to the invention. Strongly basic anion exchange resins are preferred, though weakly basic anion exchange resins can also be employed. Solid anion exchange resins are known in the art as a class, and any suitable member of the class can be employed. Examples of suitable anion exchange resins are given in the patent referred to previously. Thus for example the anion exchange resin known as "Amberlite IRA-410," comprising styrene copolymer chloromethylated and aminated to quaternary ammonium hydroxide materials, can be employed in one embodiment. This material is more fully disclosed in Patent No. 2,591,573, which issued April 1, 1952, to C. H. McBurney.

Any suitable means can be employed for contacting the hydrocarbon material with the solid anion exchange resin. In one embodiment, the hydrocarbon material is passed downwardly through a stationary compact bed of the ion exchange resin. The effluent from the bed is recirculated to provide the necessary residence time. Generally, a relatively slow rate of passage of hydrocarbons through the bed will be employed, corresponding to a liquid hourly space velocity within the approximate range of 0.01 to 1 volume of liquid hydrocarbon per volume of catalyst bed per hour.

In another embodiment, the granular ion exchange resin is admixed with liquid hydrocarbon in order to form a slurry, which is maintained in a contacting zone for a sufficient length of time to provide the sweetening effect. Suitable means are provided for agitating the mixture in order to maintain sufficient suspension of the resin in the hydrocarbon material.

In another embodiment, the liquid hydrocarbon is passed upwardly through a contacting zone containing the granular ion exchange resin, and the latter settles within the contacting zone at a rate depending upon the conditions of passage of hydrocarbon material through the zone. The rates of flow, and the recirculation if any, are adjusted to provide the necessary residence time.

In each of the above embodiments, the contacting is performed in the presence of an inhibitor sweetening agent and oxygen. Removal of the solid ion exchange resin from the sweetened hydrocarbons can be performed in any suitable manner, for example by settling, filtration, centrifuging, etc. Where the hydrocarbon material is passed either upwardly or downwardly through a bed of ion exchange resin, the effluent hydrocarbon is in some instances at least sufficiently free of the solid resin without further treatment for removal of resin.

The amount of inhibitor sweetening agent is preferably within the approximate range from 0.0001 to 1.0 weight percent based on hydrocarbons, more preferably 0.001 to 0.1 weight percent. Any suitable known phenylene diamine inhibitor sweetening agent can be employed. Examples of suitable agents are disclosed in Patent No. 2,737,472, issued March 6, 1956, to J. A. Chenicek.

The amount of oxygen employed is preferably at least the stoichiometric amount for conversion of mercaptans in the hydrocarbons to disulfides. A substantial excess can be employed if desired, e.g., up to 3 times the stoichiometric amount or more.

The temperature of the contacting is preferably within the approximate range from 50° F. to 200° F., more preferably 70° F. to 100° F. The contacting is continued for sufficient time to give the desired extent of sweetening. Generally, the time elapsed will be within the approximate range from 12 to 144 hours, though other periods can be employed in some instances.

The following examples illustrate the invention:

*Example 1*

Gasoline having a mercaptan content of 14.6 mg. per liter is treated for reduction of mercaptan content by admixing 400 ml. of the gasoline with 38 ml. of "Amberlite IRA-410" anion exchange resin in the hydroxyl form, and with N,N'-disecondary butyl phenylene diamine in amount equivalent to 5 pounds per thousand barrels of gasoline. The resin has been previously treated with aqueous sodium hydroxide to convert the resin to the hydroxyl form and has then been washed with sweetened gasoline to romve excess sodium hydroxide.

The mixture of gasoline, ion exchange resin, and phenylene diamine inhibitor is shaken with air for ½ hour and then allowed to stand for 24 hours. The ion exchange resin settles from the gasoline to form a lower layer. The mercaptan content of the upper gasoline layer is determined at intervals of 2 hours, 4 hours, and 24 hours after the beginning of the experiment. Also the alkalinity and ASTM gum rating of the upper gasoline layer are determined at intervals of 2 hours, 4 hours and 24 hours; the alkalinity is determined by intimately admixing a 50 ml. sample of the gasoline with 20 ml. of water, and determining the pH of the water. The difference between the pH obtained from the treated sample and the pH obtained from a sample of the original untreated gasoline is recorded as the alkalinity of the treated sample.

For purpose of comparison, the same procedure as above described is carried out, except that 10 ml. of 20° Bé. aqueous sodium hydroxide are employed in place of the 38 ml. of ion exchange resin. About 45 ml. of the resin are stoichiometrically equivalent to the 10 ml. of aqueous sodium hydroxide. The mercaptan content, alkalinity and gum rating of the treated gasoline are determined in a manner similar to that previously described, following the settling of the aqueous sodium hydroxide from the gasoline sample.

The following table shows the results obtained in the operation according to the invention, using ion exchange resin, as compared with conventional operation using aqueous NaOH:

|  | According to Invention (Resin) | Conventional (NaOH) |
|---|---|---|
| Mercaptan Content (mg./liter): |  |  |
| Initial | 14.6 | 14.6 |
| After 2 hours | 3.1 | 5.0 |
| After 4 hours | 2.7 | 4.6 |
| After 24 hours | 0.7 | 2.6 |
| Alkalinity (pH difference): |  |  |
| Initial | 0 | 0 |
| After 2 hours | 0.09 | 0.28 |
| After 4 hours | 0.17 | 0.84 |
| After 24 hours | 0.41 | 0.70 |
| ASTM Gum (mg./100 ml.): |  |  |
| After 24 hours | 0.6 | 2.4 |

These results show the reduced mercaptan content, alkalinity and gum obtained in operation according to the invention.

In the above operation using ion exchange resin, it is preferred to wash excess sodium hydroxide from the NaOH-treated resin with a hydrocarbon solvent prior to use in the sweetening process. Washing of the NaOH-treated resin with water is not as effective in reducing the free base content of the resin to a desirably low level. Excess free base in the resin results in higher alkalinity and gum rating in the sweetened gasoline obtained using the resin.

*Example 2*

Gasoline obtained by thermal cracking of petroleum is subjected to inhibitor sweetening employing 0.01 weight percent of N-N'-disecondary butyl phenylene diamine based on gasoline. The charge stock has an A.P.I. gravity of about 62 and contains about 0.025 weight percent of mercaptan sulfur. Ten parts by weight of "Amberlite IRA-410" in the hydroxyl form are admixed with 100 parts by weight of the gasoline containing the indicated amount of inhibitor sweetening agent. The resulting slurry is maintained in a contacting zone for 144 hours with agitation to keep the resin sufficiently dispersed in the hydrocarbons. The operation is carried out at 75° F., and air is introduced at a sufficient rate to provide approximately one mole of oxygen per two moles of mercaptans in the gasoline.

At the end of the contacting period, the ion exchange resin is filtered from the sweetened gasoline. The filtered ion exchange resin is washed with a suitable solvent such as n-pentane in order to remove gasoline remaining thereon. The removed gasoline can be combined if desired with the filtrate obtained in the filtering operation. The recovered iron exchange resin is used to contact additional gasoline in a sweetening operation similar to that previously described.

Generally similar results are obtained in the above operation to those obtained in the Example 1 operation employing ion exchange resin.

The process of the invention is applicable generally to hydrocarbons which are capable of being sweetened by the inhibitor sweetening technique. Thermally cracked or catalytically cracked gasoline are typical examples of suitable charge stocks. Straight run gasolines should be admixed with olefinic hydrocarbons, such as those contained in cracked gasoline, in order to obtain a suitable charge stock for inhibitor sweetening. Any other hydrocarbon distillate which is susceptible to inhibitor sweetening can be employed in the process according to the invention.

Generally similar results to those obtained in the above example are obtained using other well known inhibitor sweetening agents or other solid anion exchange resins such as those disclosed in the Coonradt and Leaman patent previously referred to.

This application is a continuation-in-part of application Serial No. 812,119, filed May 11, 1959, by the present inventor, and now abandoned.

The invention claimed is:

1. Process for reducing the mercaptan content of hydrocarbons by oxidation of mercaptans to disulfides which comprises contacting hydrocarbons containing mercaptans with a phenylene diamine inhibitor sweetening agent and oxygen in the presence of an alkaline catalyst consisting essentially of a solid anion exchange resin, and separating hydrocarbons having reduced mercaptan content from the solid resin.

2. Process according to claim 1 wherein said agent is N,N'-disecondary butyl phenylene diamine.

3. Process according to claim 1 wherein the amount of said agent is 0.0001 to 1 weight percent based on hydrocarbons.

4. Process according to claim 1 wherein the temperature of contacting is within the approximate range from 50° F. to 200° F.

References Cited in the file of this patent

UNITED STATES PATENTS

| 2,616,831 | Rosenwald | Nov. 4, 1952 |
| 2,899,396 | Adams et al. | Aug. 11, 1954 |